United States Patent [19]

Rowe et al.

[11] Patent Number: 4,822,861

[45] Date of Patent: Apr. 18, 1989

[54] METHOD FOR THE PREPARATION OF POLYVINYL PHOSPHONIC ACID

[75] Inventors: William Rowe, Califon; Shashikant Saraiya, Parlin; Ajay Shah, Elizabeth, all of N.J.

[73] Assignee: Polychrome Corporation, Yonkers, N.Y.

[21] Appl. No.: 168,204

[22] Filed: Mar. 15, 1988

[51] Int. Cl.[4] ............................................. C08F 8/12
[52] U.S. Cl. .................................. 525/355; 525/326.1; 525/330.7
[58] Field of Search ................... 525/355, 326.1, 330.7; 526/274, 277, 278

[56] References Cited

U.S. PATENT DOCUMENTS

| | | | |
|---|---|---|---|
| 3,297,663 | 1/1967 | Herbst et al. | 526/78 |
| 3,892,578 | 7/1975 | Golborn et al. | 526/271 |
| 3,943,074 | 3/1976 | Dulog | 526/278 |
| 3,943,113 | 3/1976 | Jin | 526/278 |
| 3,956,421 | 5/1976 | Roberts et al. | 526/277 |
| 3,993,715 | 11/1976 | Hwa et al. | 526/278 |
| 4,014,839 | 3/1977 | Kraft et al. | 526/278 |
| 4,017,257 | 4/1977 | Weil | 526/278 |
| 4,033,983 | 5/1977 | Starks | 526/278 |
| 4,153,401 | 5/1979 | Berghauser et al. | 428/469 |
| 4,299,940 | 11/1981 | Wei | 526/278 |
| 4,342,857 | 8/1982 | Gaffar | 526/278 |
| 4,444,969 | 4/1984 | Younes | 526/278 |
| 4,560,618 | 12/1985 | Goswami | 526/278 |
| 4,624,795 | 11/1986 | Dawson et al. | 525/326.6 |
| 4,696,987 | 9/1987 | Dursch et al. | 526/278 |

Primary Examiner—Joseph L. Schofer
Assistant Examiner—Bernard Lipman

[57] ABSTRACT

A process for preparing polyvinyl phosphonic acid by the steps of polymerizing bis(2-chloroethyl) vinyl phosphonate in the presence of a free radical initiator or catalyst, such as dicumyl peroxide. The resulting poly bis(2-chloroethyl) vinyl phosphonate is then subjected to acid hydrolysis to obtain high purity polyvinyl phosphonic acid having measurable and controllable molecular weight distribution.

10 Claims, No Drawings

METHOD FOR THE PREPARATION OF POLYVINYL PHOSPHONIC ACID

FIELD OF THE INVENTION

The present invention pertains to an improved method for the preparation of polyvinyl phosphonic acid (PVPA). More specifically, the invention relates to a process for obtaining purified polyvinyl phosphonic acid having highly desirable solubility characteristics and controllable molecular weight distribution.

BACKGROUND OF THE INVENTION

In U.S. Pat. No. 3,297,663 (Herbst et al.) there is described a precipitation polymerization process for preparing polyvinyl phosphonic acid from vinyl phosphonic acid monomer dissolved in a non-polymerizable organic liquid that is a non-solvent for the polymer product. The polymerization is carried out with the use of a free radical polymerization catalyst and/or ultraviolet light. The Herbst et al. precipitation polymerization process is described as being unique in utilizing vinyl phosphonic acid monomer as the starting material and further in overcoming the difficulties encountered when polymerizing vinyl phosphonic acid dichloride (German Pat. No. 1,032,537) or vinyl phosphonic acid esters (Pudovik, Doklady. Akad. Nauk. 80, 65–68 (1951)).

The disclosures of Herbst et al. in column 1, line 20, to column 2, line 38, pertaining to prior art processes as well as the patented process are incorporated herein by reference.

U.S. Pat. No. 4,578,156 (Plazter) discloses and claims the use of polyvinyl phosphonic acid in preparing lithographic plates. More particularly, Plazter coats an anodized aluminum sheet with polyvinyl phosphonic acid and refers to prior U.S. Pat. No. 4,153,461.

The preparation of polyvinyl phosphonic acid is complicated even when employing the Herbst et al. precipitation polymerization process. Initially, this process involves a technically elaborate preparation of vinyl phosphonic acid (VPA) followed by the polymerization of the latter. It has been found, however, that this process gives many by-products that are carried into the final product. Consequently, the polyvinyl phosphonic acid product is characterized by varying random molecular weight distributions and varying solubilities in water at use concentrations. These are indications that undesirable by-products are produced and are carried into the PVPA product obtained by the Herbst et al. process.

Uniform PVPA is a must when it is to be employed in coating photolithography plates such as, for example, coating aluminum plates prior to application of the photosensitive layer. It is essential to seal the aluminum plate surface uniformly and with consistency so that uniform topcoat adhesion does not vary so that length of run and developing characteristics remain consistent.

It would be desirable to have a process available for the production of polyvinyl phosphonic from a monomer other than vinyl phosphonic acid, where substantially pure polyvinyl phosphonic acid with repeatable molecular weight distributions is obtained.

SUMMARY OF THE INVENTION

In accordance with the present invention, bis(2-chloroethyl) vinyl phosphonate is employed as the starting material. Polymerization is carried out at a temperature of at least 100° C. for a time period ranging from 75 to 100 hours. A free radical liberating catalyst is employed such as, for example, dicumyl peroxide, benzoyl peroxide, 2,2'-azo-bis(2,4-dimethyl valeronitrile).

The polymerization yields poly bis(2-chloroethyl) vinyl phosphonate, which is then hydrolyzed in a separate treatment to polyvinyl phosphonic acid. Another aspect of the present invention is that acid hydrolysis rather than alkaline should be carried out. This enhances the isolation of the desired polyvinyl phosphonic acid product.

By practicing the improved process of this invention high purity polyvinyl phosphonic acid products can be obtained with repeatable molecular weight distributions. As previously noted, such a PVPA product enables one to seal the surface of the aluminum substrate in approximately the same fashion and to the same degree.

DETAILED DESCRIPTION OF THE INVENTION

As set forth above, the invention is concerned with a process for producing high purity polyvinyl phosphonic acid (PVPA) under conditions that lead to a desired PVPA product with an ascertainable molecular weight distribution. Such control is essential to obtain PVPA having repeatable performance characteristics. It is to be understood that molecular weight and solubility characteristics are related to each other.

In general, the process comprises polymerizing bis-(2-chloroethyl) vinyl phosphonate to obtain poly bis(2-chloroethyl) vinyl phosphonate, which is subsequently hydrolyzed to poly vinyl phosphonic acid. The reactions involved are diagrammatically illustrated below:

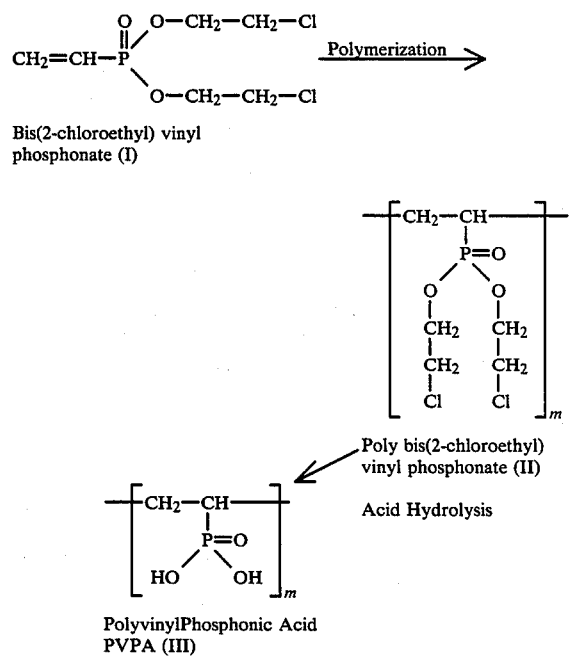

The preferred starting material for the process is bis(2-chloroethyl) phosphonate. This compound is obtained from Stauffer Chemical, Westport, Conn., under the commercial name of Fyrol Bis Beta. The purity is 98% minimum. It will be understood, however, that other bis(2-haloalkyl) phosphonates may be utilized.

Thus, the halogen constituent may be chloro, bromo or fluoro; while the alkyl group may be a lower alkyl having from 1 to 6 carbon atoms, preferably 2 to 4 carbon atoms. The feed is preferably in a substantially purified form.

Polymerization is carried out in a closed reactor vessel provided with agitation means such as a mechanical agitator with stainless steel single blade paddles as known in the art. After the adding of the feed, a minor amount of an initiator or free-radical catalyst is admixed with stirring. The resulting reaction mixture is heated at a temperature of from about 50° to 150° C., preferably about 80° to 100° C., with stirring while maintaining an inert atmosphere. The elevated temperature and agitation is maintained for a sufficient period of time to attain the desired polymerization. For most purposes time of polymerization will range from 25 to 120 hours, and preferably 50 to 100 hours.

The polymerization reaction is monitored by gel permeation chromatography (GPC) and a Brookfield RTV Viscometer.

Some free radical initiators or catalysts useful in this process are listed:
dicumyl peroxide
benzoyl peroxide
2,2'-azo-bis(2,4-dimethyl valeronitrile)
di-tertiary butyl peroxide
Lauroyl peroxide
tertiary butyl-peroxy pivalate
2,5-dimethyl-2-5-di(t-butyl peroxy) hexane
2,2'-azo bis(4 methoxy 2,4-dimethyl valeronitrile)
2,2'-azo-bis(isobutyronitrile)
1,1'-azo-bis(cyclohexane carbonitrile)
and the like.

The preferred catalyst is dicumyl peroxide, and only catalytic amounts of the initiator or catalyst need be employed. Generally the amount will be from 0.5% to 2.0% by weight based on the weight of the bis(2-chloroethyl) vinyl phosphonate.

Nitrogen is preferred choice for the inert gas, although other gases that may be employed include dry carbon dioxide.

Conventional stirrers such as mechanical agitation as known in the art may be utilized.

The polymerization reaction product mixture is treated to separate out poly bis(2-chloroethyl) vinyl phosphonate therefrom by being dissolved in ethyl acetate and by then adding cyclohexane. Whereas the poly bis(2-chloroethyl) vinyl phosphonate separates out, unreacted bis(2-chloroethyl) phosphonate remains dissolved in the solvent mixture. Instead of ethyl acetate other solvents such as propyl acetate, butyl acetate, cellosolve acetate, methyl cellosolve acetate, Isobutyl acetate, hexyl acetate, and the like may be used.

In place of cyclohexane, the organic solvents that may be employed are hexane, heptane, or other lower aliphatic hydrocarbons, and the like.

It will be understood that the amount of non-polymerizable organic compounds, e.g. ethyl acetate and cyclohexane, are not critical and may, in fact vary over a wide range. Only that amount of ethyl acetate or other solvent sufficient to dissolve the polymerization reaction product need be employed, while the amount of cyclohexane or other precipitant liquid need not exceed the amount necessary to separate the poly bis(2-chloroethyl) vinyl phosphonate.

The recovered poly bis(2-chloroethyl) vinyl phosphonate is next subjected to hydrolysis, preferably acid hydrolysis, with aqueous solutions of acids such as hydrochloric, hydrobromic and the like. Following completion of the hydrolysis treatment, excess acidic solution is removed by distillation and/or by washing with deionized water. Reduced pressure or vacuum distillation can be employed.

In accordance with the preferred method of the invention, the residual PVPA water solution will be evaporated to dryness under vacuum to obtain the desired product in the form of a white powder.

Quantitative yields are obtained and the solid PVPA product is characterized by the desirable properties discussed above. More particularly, the data presented herein will show that the process of this invention yields a polyvinyl phosphonic acid product of exceptional purity and that it is possible to control the molecular weight distribution.

An important use of the PVPA product obtained by the process of this invention is coating of aluminum photolithographic plates prior to applying the photosensitive layer. The PVPA may also be used in the manufacture of plastic, shaped articles.

The invention will be more fully understood by reference to the following embodiments.

EXAMPLE I

In a one liter resin flask, 500 g of bis(2-chloroethyl) vinyl phosphonate (I) and 5 g dicumyl peroxide were heated with stirring to 100° C. under an inert atmosphere and held at 100° C. for 90 hours. The reaction was controlled by GPC and RTV Brookfield Viscometer. The resultant viscous liquid was dissolved in 1100 ml ethyl acetate. To this mixture was slowly added 875 ml cyclohexane to separate out the poly bis(2-chloroethyl) vinyl phosphonate (II). The unreacted bis(2-chloroethyl) vinyl phosphonate remained in the solvent mixture. GPC chromatographs were run on the poly bis(2-chloroethyl) vinyl phosphonate and $M_n$, $M_w$, $M_z$ and poly dispersity values obtained.

The poly bis(2-chloroethyl) vinyl phosphonate was mixed with three times its volume of 35% hydrochloric acid and heated to and held at reflux for 75 hours. Hydrochloric acid was distilled off under reduced pressure and was completely removed by continuously washing the mother liquor (containing PVPA) with deionized water while distilling off excess water until the distillate gave no white precipitates of silver chloride when mixed with a dilute solution (5%) of silver nitrate and nitric acid, indicating no free hydrochloric acid is present. The PVPA (III) water solution was then evaporated to dryness under vacuum and a white powder was obtained. The infra-red, $P^{31}$NMR and elemental analysis confirmed the structure of PVPA. The yield was quantitative.

EXAMPLE II

Table 1 covers the use of various free-radical catalysts in the polymerization step. The viscosity was measured by a Brookfield RTV Viscometer, while the percentage of residual unsaturation indicates the amount of unreacted bis(2-chloroethyl) vinyl phosphonate, determined by bromate/bromide method for measuring unsaturation in organic compounds. Unreacted bis(2-chloroethyl) vinyl phosphonate was separated by the ethyl acetate/cyclohexane method described in Example I.

The molecular weight distribution of poly bis(2-chloroethyl) vinyl phosphonate was checked from several Runs of Table I. The results are summarized in Table II. The conditions used were as follows:
Instrument: Water Associates ALC/GPC 244LC
Columns: 100, 10³ and 500° A Ultra Styragel
Concentration: 0.5% w/v in Tetrahydrofuran
Flow Rate: 1 ml/min.
Mobile Phase: Tetrahydrofuran (HPLC Grade)
Detector: Refractive Index No. 401
Temperature: 25° C.

TABLE 1
CATALYST STUDY

| Run No. | Catalyst | Reaction Temperature °C. | Reaction Time Hrs | Color (G-H '33) | Viscosity CPA | Residual Unsaturation* % |
|---|---|---|---|---|---|---|
| 1 | 0.5% 2,2'-azo-bis(2,4 dimethyl-valeronitrile) | 25 | 72 | — | — | — |
| 2 | 1% 2,2'-azo-bis (2,4 dimethyl-valeronitrile) | 51 | 25 | 2 | 960 | 14.7 |
| 3 | 2% 2,2'-azo-bis (2,4 dimethyl-valeronitrile) | 51 | 25 | 5 | 1760 | 31.8 |
| 4 | 4% 2,2'-azo-bis (2,4 dimethyl-valeronitrile) | 51 | 25 | 7 | 9850 | 22 |
| 5 | 8% 2,2'-azo-bis (2,4 dimethyl-valeronitrile) | 51 | 25 | 9 | 19500 | 21.7 |
| 6 | 8% 2,2'-azo-bis (2,4 dimethyl valeronitrile | 52 | 50 | 9 | 26500 | 20 |
| 7 | 1% Benzoyl Peroxide | 70 | 88 | 1+ | 20000 | 23.5 |
| 8 | 1% Dicumyl Peroxide | 100 | 95 | 5+ | 67500 | 18.4 |

*Free Monomer

TABLE 11
MOLECULAR WEIGHT DISTRIBUTION

| Run Number (From Table I) | Catalyst | Molecular Weight Distribution Poly Bis (2-Chloroethyl) Vinyl Phosphonate | |
|---|---|---|---|
| | | Polymer/Monomer Mixture | Pure Polymer |
| 3 | 2% 2,2'-azo-bis (2,4 dimethyl-valeronitrile) | $\overline{M_n}$ = 701<br>$\overline{M_w}$ = 3498<br>$\overline{M_z}$ = 9441<br>Poly Dispersity = 4.99 ($\overline{M_w}/\overline{M_n}$) | $\overline{M_n}$ = 1626<br>$\overline{M_w}$ = 6536<br>$\overline{M_z}$ = 11747<br>Poly Dispersity = 4.01 |
| 6 | 8% 2,2'-azo-bis (2,4 dimethyl-valeronitrile) | $\overline{M_n}$ = 1075<br>$\overline{M_w}$ = 4476<br>$\overline{M_z}$ = 10086<br>Poly Dispersity = 4.16 | $\overline{M_n}$ = 2590<br>$\overline{M_w}$ = 7235<br>$\overline{M_z}$ = 11785<br>Poly Dispersity = 2.79 |
| 7 | 1% Benzoyl Peroxide | $\overline{M_n}$ = 878<br>$\overline{M_w}$ = 3457<br>$\overline{M_z}$ = 7712<br>Poly Dispersity = 3.94 | $\overline{M_n}$ = 1595<br>$\overline{M_w}$ = 4691<br>$\overline{M_z}$ = 8393<br>Poly Dispersity = 2.94 |
| 8 | 1% Dicumyl Peroxide | $\overline{M_n}$ = 860<br>$\overline{M_w}$ = 1642<br>$\overline{M_z}$ = 2575<br>Poly Dispersity = 1.91 | $\overline{M_n}$ = 1221<br>$\overline{M_w}$ = 2222<br>$\overline{M_z}$ = 3291<br>Poly Dispersity = 1.82 |

In Table III below polyvinyl phosphonic acid (Run A) prepared in accordance with the procedure of Example 7 (incorporated herein by reference) of U.S. Pat. No. 3,297,663, including an initial step of forming the vinyl phosphonic acid, was compared by P³¹ NMR analysis with polyvinyl phosphonic acid (Run B) prepared by the method of the present invention as set forth in Example I.

TABLE III

| COMPONENTS | A | B |
|---|---|---|
| Polyvinyl phosphonic acid | 72.9% | 100% |
| Polyvinyl pyrophosphonic acid | 9.0% | — |
| Polyvinyl poly phosphonic acid | 1.1% | — |
| Vinyl Phosphonic acid | 10.9% | — |

TABLE III-continued

| COMPONENTS | A | B |
|---|---|---|
| Vinyl phosphonic ester | .2% | — |
| Chloroethyl phosphonic acid | 3.3% | — |
| Chloroethyl phosphate | .5% | — |
| 'N' group on polymer | 1.1% | — |
| Phosphates | .2% | — |

Sample B PVPA prepared by the inventive process is therefore pure, of known molecular weight distribution, and has the desired solubility characteristics.

It will be further understood that the process described and illustrated above is obviously subject to variations and modification without departing from the broader aspects of this invention.

What is claimed is:

1. A process for preparing polyvinyl phosphonic acid, which comprises polymerizing bis(2-haloalkyl) vinyl phosphonate to form a reaction product mixture comprising poly bis(2-haloalkyl) vinyl phosphonate, and then admixing said poly bis(2-haloalkyl) vinyl phosphonate with an aqueous acidic solution to effect hydrolysis whereby polyvinyl phosphonic acid is obtained.

2. The process of claim 1 wherein the polymerization is carried out in the presence of a free radical initiator.

3. The process of claim 2 wherein said free-radical initiator is dicumyl peroxide.

4. The process of claim 2 wherein said free-radical initiator is benzoyl peroxide.

5. The process of claim 2 wherein said free-radical initiator is 2,2'-azo bis(2,4-dimethylvaleronitrile).

6. The process of claim 1 wherein the hydrolysis is carried out with an aqueous solution of hydrochloric acid.

7. The process of claim 1 wherein the bis(2-haloalkyl) vinyl phosphonate is bis(2-chloroethyl) vinyl phosphonate.

8. The process of claim 7 wherein the polymerization reaction product mixture is dissolved in an organic solvent, and the poly bis(2-chloroethyl) vinyl phosphonate is precipitated from the resulting solution.

9. The process of claim 8 wherein the organic solvent is ethyl acetate.

10. The process of claim 8 wherein cyclohexane is added to the resulting solution to precipitate poly bis(2-chloroethyl) vinyl phosphonate therefrom.

* * * * *